UNITED STATES PATENT OFFICE.

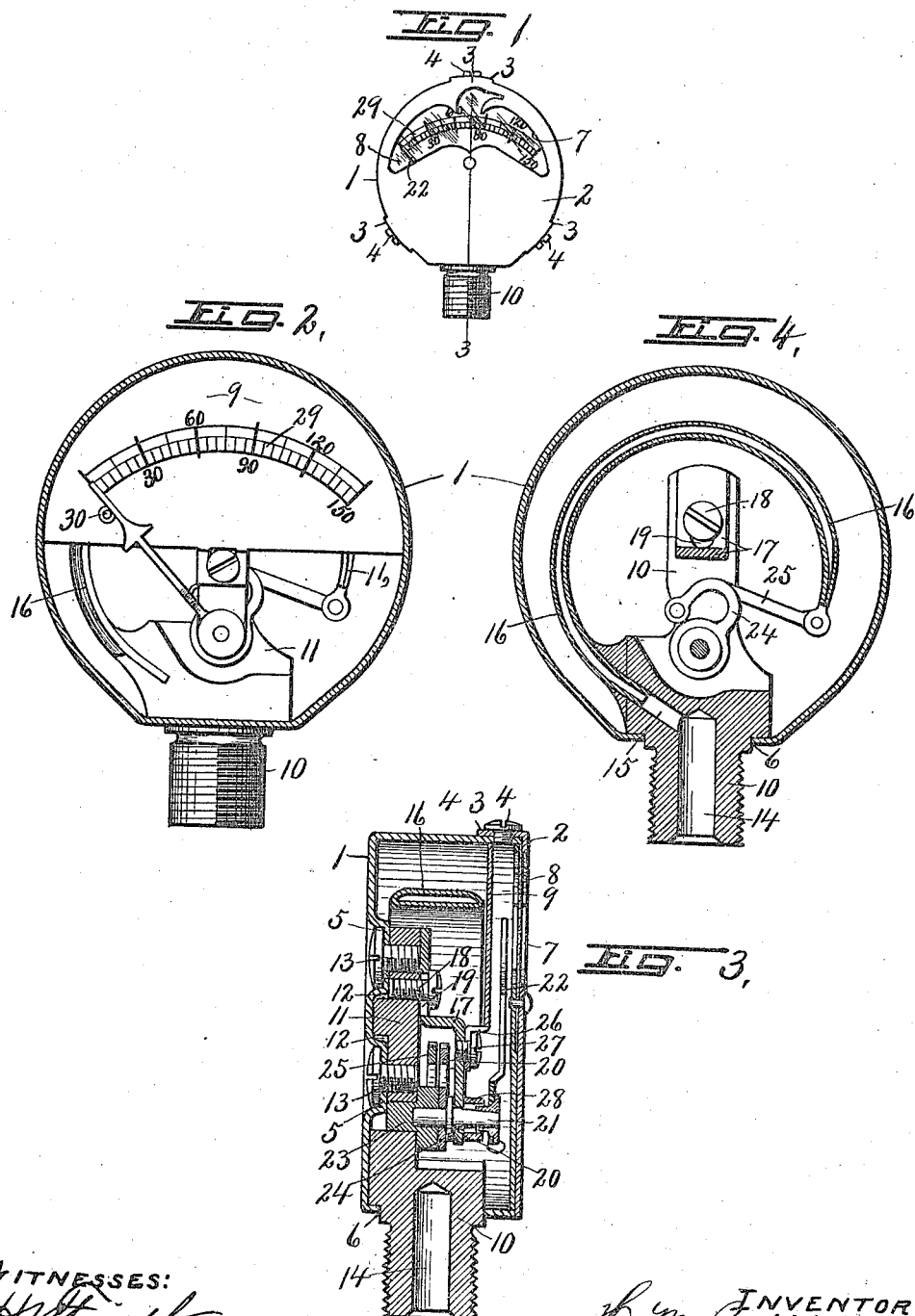

HAIG M. BABIKIAN, OF EAST SYRACUSE, NEW YORK.

PRESSURE-GAGE.

1,233,297.  Specification of Letters Patent.  Patented July 17, 1917.

Application filed February 1, 1917. Serial No. 145,938.

*To all whom it may concern:*

Be it known that I, HAIG M. BABIKIAN, a citizen of the United States of America, and resident of East Syracuse, in the county of Onondaga, in the State of New York, have invented new and useful Improvements in Pressure-Gages, of which the following, taken in connection with the accompanying drawings, is a full, clear, and exact description.

This invention relates to certain improvements in pressure gages for testing the air pressure in pneumatic tires, supply tanks therefor and analogous purposes, and involves the use of a Bourdon tube and an index finger actuated thereby around a suitable dial, all inclosed within a circular case with suitable means for attachment of the case to the container for the air, the pressure of which is to be tested.

These gages are subjected to more or less rough and careless handling, and in view of the fact that the pointer end of the index finger is a considerable distance from its fulcrum, any slight variation in the position of the fulcrum would cause a large discrepancy in the accuracy of reading the free end of the pointer on the dial.

One of the main objects, therefore, of my present invention is to provide more efficient means for holding the outer or front end of the spindle which supports the pointer against lateral displacement under the rough or careless handling referred to.

Another object is to increase the general efficiency of the entire gage, particularly by providing the tubular inlet nipple, to which one end of the Bourdon tube is secured, with an integral arm extending diametrically across the inner face of and within the case, and partially held in place by countersunk bosses entering corresponding recesses in the adjacent sides of the back and arm to afford a substantial supporting means for a bracket carrying the outer end of the pointer spindle and dial, so that the crank arm which is secured to the spindle and connected to the free end of the Bourdon tube may be located in the space between a portion of the bracket and arm.

Another object is to utilize the bracket for supporting the dial wholly above the spindle which carries the pointer.

A still further object is to enable the parts to be assembled in sequence from the back forwardly after the tubular nipple with the Bourdon tube secured thereto has been placed in operative position, thereby greatly accelerating the work of assembling, and enabling the operator to properly adjust the parts as they are assembled.

Other objects and uses relating to specific parts of the device will be brought out in the following description.

In the drawings—

Figure 1 is a front elevation of a pressure gage embodying the features of my invention.

Fig. 2 is an enlarged front elevation of the interior mechanism of the same gage, the case being shown in section.

Fig. 3 is an enlarged transverse vertical sectional view taken on line 3—3, Fig. 1.

Fig. 4 is a sectional view taken in the plane of line 4—4, Fig. 3.

As illustrated, this gage comprises a substantially circular sheet metal case —1— having a removable cover —2— across its front side provided with axially extending lugs —3— overlying upon the periphery of the main body of the case and secured thereto by suitable fastening means, as screws —4—, so that the cover may be readily removed when necessary by simply removing the screws.

The back of the case is provided with a pair of countersunk bosses —5— arranged in a diametrical plane passing through the center of a peripheral opening —6— for a purpose hereinafter described, the front or cover section —2— being provided with a circumferentially elongated sight opening —7— across which is secured a transparent plate —8— to permit the reading on a dial —9— within the case.

A tubular nipple —10— is secured within the peripheral opening —6— within the case and is provided with an integral arm —11— extending diametrically across the inner face of the back of and within the case —1— in line with the countersunk bosses —5— and, therefore, in the radial plane of the opening —6— and is provided in its rear face with recesses —12— for receiving said bosses so that when the latter are registered with the recesses they will aid in locking the back of the case and arm —11— to each other.

These parts are, however, additionally secured together by bolts —13— passing through apertures in the bosses —5— and engaging threaded apertures in the arm —11—, the heads of the bolts being wholly within the countersunk portions of the bosses, thus leaving the back of the case substantially smooth, or rather free from projections beyond the plane thereof.

The nipple —10— is provided with an inlet —14— having a branch —15— to which is connected one end of a Bourdon tube —16— which is rigidly secured to the main body of the nipple so that it may be assembled thereon before the latter is inserted into the case.

A plate or bracket —17— is secured at one end by a screw —18— to the front face of the arm —11—, said end being slotted longitudinally at —19— to permit slight radial adjustment of the plate or bracket to adapt it to receive one end of the spindle for the index finger, presently described.

The opposite or lower end of the plate or bracket —17— is spaced apart from, but parallel with, the front face of the arm —11— so as to overlie the same and is provided with a bearing —20— for receiving the adjacent end of a rock shaft or spindle —21— carrying the index finger —22— which is movable around the front face of the dial —9—.

The rear end of the spindle —21— is journaled in a suitable bearing —23— on the arm —11—, thus providing outer and inner bearings for opposite ends of the spindle to better support the same against lateral movement as it is rocked by the Bourdon tube.

Secured to the intermediate portion of the spindle within the space between the lower end of the bracket —17— and front face of the arm —11— is a crank arm —24— which is flexibly connected by a link —25— to the free end of the Bourdon tube —16— so that any movement which may be imparted to said tube by air pressure therein will be transmitted to the rock shaft or spindle —21— and thence to the index finger —22— for registering the pressure upon the dial —9—, the latter being graduated in degrees per square inch of pressure.

Securing the crank arm —24— to the intermediate portion of the spindle —21— between the bearings —20— and —23— brings the application of the power necessary to turn said spindle between the bearings, with the result that there is less liability of springing the spindle than would be the case if the latter were journaled at one end only and the turning power applied to a point more remote from the journal bearing.

This arrangement assures a more permanent accuracy of reading and also materially braces the spindle against accidental displacement in case the instrument as a whole should be brought into abrupt contact with any external object.

The bracket —17— also serves as a means for supporting the dial plate —9— which is substantially semi-circular and extends across the upper half of the interior of the shell or case —1—, the central portion of the lower edge of said dial plate being provided with an apertured lug or ear —26— secured against the front face of the bracket —17— by means of a screw —27—, so that the plate is held in place by a single fastening screw and is spaced apart from the front or cover section —2— to permit the free operation of the index finger —22— in said space.

The hub of the pointer —22— is provided with a tapered socket frictionally fitted upon a tapered front end of the spindle —21— so that it may be readily removed or adjusted when the cap or cover —2— is removed.

In assembling the parts of this device, assuming that the cap or cover —2— is removed, the nipple —10— with the Bourdon tube secured thereto is inserted through the open front of the main body of the case at an angle to the axis thereof, in such manner that the nipple —10— will enter and pass through the peripheral opening —6— with the lower end of the arm —11— resting against the inner face of said periphery at one side of the opening.

When the nipple and the Bourdon tube thereon have been thus placed, the arm —11— will lie flatwise against the back of the case with its recesses —12— registering with their corresponding bosses —5—, whereupon the screws —13— may be secured in place to lock the nipple with the parts carried thereby in operative position.

The spindle —21— with the crank arm —24— thereon is then placed in operative position with its rear end in the bearing —23—, whereupon the plate or bracket —17— is secured in operative position to the front face of the arm —11— and its bearing —20— in engagement with the outer end of the spindle —21—.

The dial plate —9— is then secured in place to the front face of the bracket —17—, after which the index finger —22— is placed in operative position upon the outer end of the spindle —21— and the front cap or cover —2— is then secured in place to complete the gage.

If necessary a spacing sleeve —28— may be placed over and upon the outer end of the spindle —21— between the front face of the bracket —17— and hub of the pointer —22— to limit the inward movement of the pointer against frictional contact with the front face of the dial without in any way interfering with the free turning movement of the spindle and pointer thereon.

The scale, as —29—, on the front face of the dial is concentric with the spindle —21— and is suitably calibrated or graduated in degrees of pressure per square inch, the pointer being normally set at zero against a suitable stop pin —30— on the dial plate.

What I claim is:

1. In a pressure gage of the character described, the combination of a circular case having a radial opening in one side and inwardly projecting countersunk bosses in its back, a tubular nipple in said opening having an integral arm extending diametrically across the inner face of the back of and within the case and provided with recesses for receiving said bosses, screws passing through apertures in said bosses and engaging said arm for securing the case and nipple to each other, a Bourdon tube secured at one end to the nipple, a bracket secured at one end to the inner end of said arm and having its opposite end spaced apart therefrom, a spindle extending across said space and having one end journaled in the bracket and the other end journaled in the arm, a crank arm secured to the intermediate portion of the spindle within said space, a link connecting the crank arm with the free end of the tube, a dial plate secured to the bracket, and an index finger secured to the spindle to turn therewith about the dial.

2. In a pressure gage of the character described, the combination of a case, an air inlet nipple having an arm extending diametrically across the inner face of the back of the case and secured thereto, a Bourdon tube having one end secured to the nipple and communicating with the passage therein, a bracket having its upper end secured to the front face of said arm and its lower end spaced apart therefrom, coaxial bearings in the lower end of the bracket and adjacent portion of the arm, a spindle extending across the space and journaled in said bearings, a crank arm secured to the spindle to turn in said space, connections between the free end of the Bourdon tube and crank arm, a dial secured to the front face of the bracket wholly above the spindle, and a pointer mounted on the front end of the spindle to turn therewith about the dial.

In witness whereof I have hereunto set my hand this 23d day of January, 1917.

HAIG M. BABIKIAN.

Witnesses:
H. E. CHASE,
ALICE M. CANNON.